(12) United States Patent
Anderson et al.

(10) Patent No.: US 7,156,607 B2
(45) Date of Patent: Jan. 2, 2007

(54) CARTON STACKING APPARATUS AND METHOD

(75) Inventors: David L. Anderson, Alexandria, MN (US); Chad W. Hahn, Alexandria, MN (US); Jason P. Lattimer, Alexandria, MN (US)

(73) Assignee: Douglas Machine, Inc., Alexandria, MN (US)

( * ) Notice: Subject to any disclaimer, the term of this patent is extended or adjusted under 35 U.S.C. 154(b) by 86 days.

(21) Appl. No.: 10/680,452

(22) Filed: Oct. 7, 2003

(65) Prior Publication Data

US 2005/0074321 A1 Apr. 7, 2005

(51) Int. Cl.
  *B65G 57/00* (2006.01)
  *B65H 31/30* (2006.01)

(52) U.S. Cl. ............... 414/790; 414/793.4; 414/788.1; 414/788.8; 414/789.9; 198/347.1; 198/435

(58) Field of Classification Search ............. 414/788.1, 414/788.8, 789.9, 790, 793.4; 198/347.1, 198/435, 465.1, 607; 271/200, 212
See application file for complete search history.

(56) References Cited

U.S. PATENT DOCUMENTS

| | | | |
|---|---|---|---|
| 1,766,142 A | * | 6/1930 | Olson ..................... 198/463.2 |
| 1,901,928 A | | 3/1933 | Olson |
| 3,866,763 A | * | 2/1975 | Alduk ..................... 414/790.1 |
| 4,820,103 A | * | 4/1989 | Dorner et al. ........... 414/789.9 |
| 4,927,322 A | * | 5/1990 | Schweizer et al. ....... 414/788.1 |
| 5,088,883 A | * | 2/1992 | Focke et al. ............... 414/795 |
| 5,339,942 A | * | 8/1994 | Gasser et al. ............ 198/347.1 |
| 5,415,280 A | * | 5/1995 | Balboni et al. ............. 198/435 |
| 5,427,252 A | * | 6/1995 | Teegarden et al. .......... 209/540 |
| 5,543,699 A | | 8/1996 | Schoeneck |
| 5,964,570 A | * | 10/1999 | Dimion et al. ........... 414/791.6 |
| 6,135,705 A | | 10/2000 | Katoch |
| 6,764,273 B1 | * | 7/2004 | Freudelsperger ......... 414/798.9 |

* cited by examiner

*Primary Examiner*—Gene O. Crawford
*Assistant Examiner*—Greg Adams
(74) *Attorney, Agent, or Firm*—Alan D. Kamrath; Nikolai & Mersereau, P.A.

(57) ABSTRACT

An apparatus for stacking incoming items includes a receiving mechanism for receiving incoming items, a stacking mechanism for receiving items from the receiving mechanism and stacking the items in a stacking area, a buffering mechanism for receiving incoming items when the stacking mechanism is full, and a stack unloading mechanism. Methods of operation include receiving an item in an item receiving mechanism, moving the item receiving mechanism to track the motion of a stacking mechanism, transferring the item from the receiving mechanism to the stacking mechanism, stacking the item in a stacking area, and unloading the stacking area when the stacking area is full of items.

33 Claims, 14 Drawing Sheets

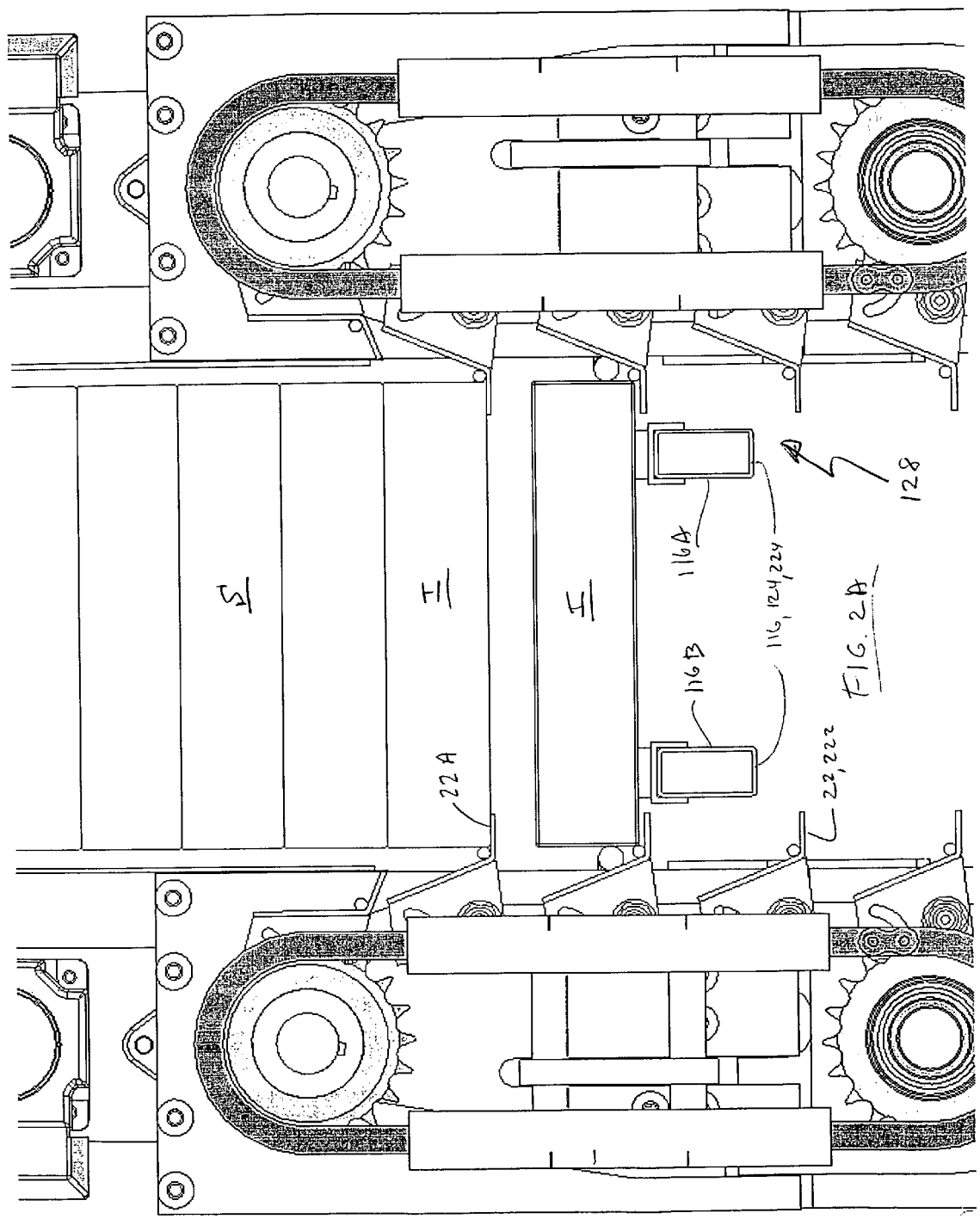

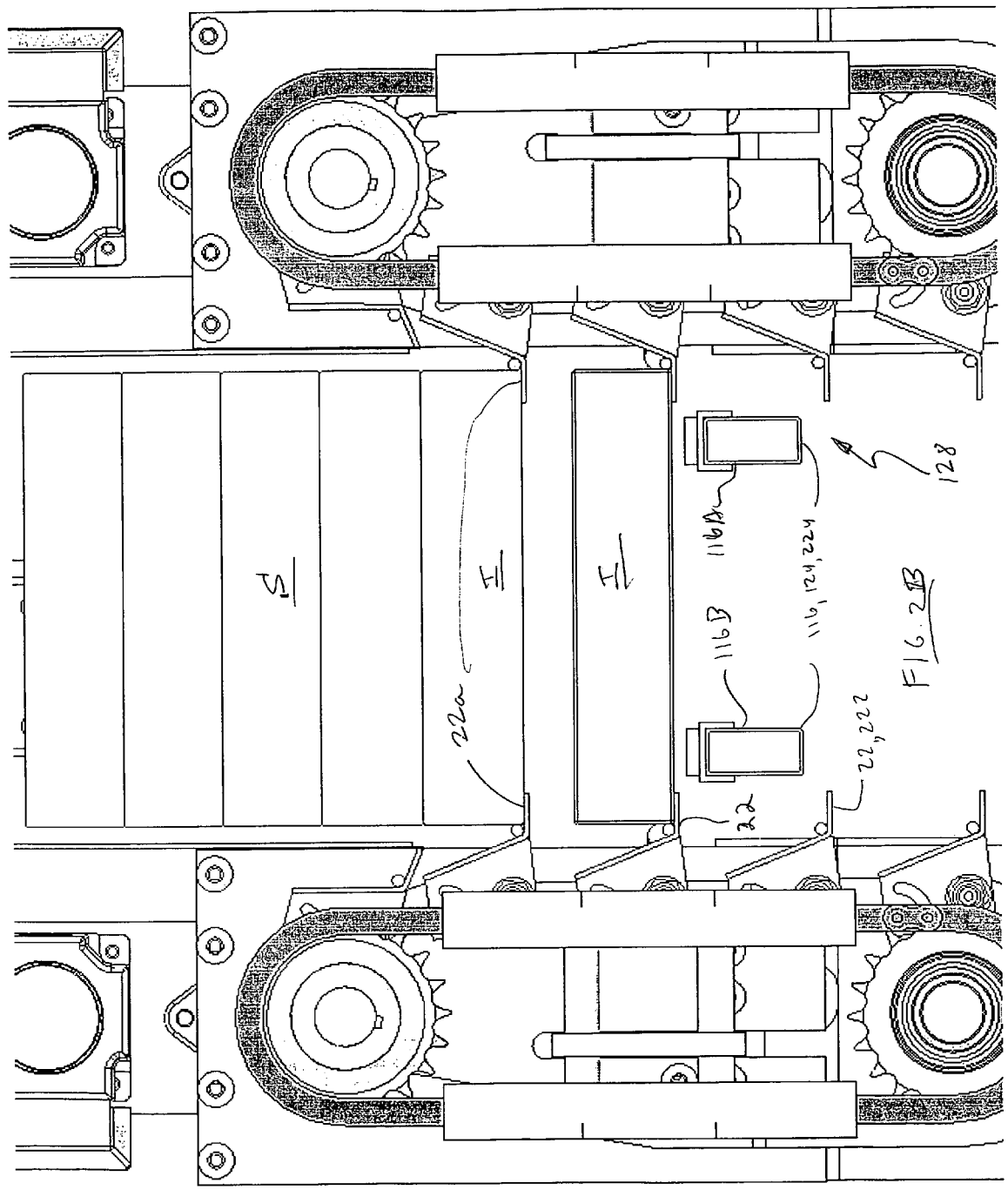

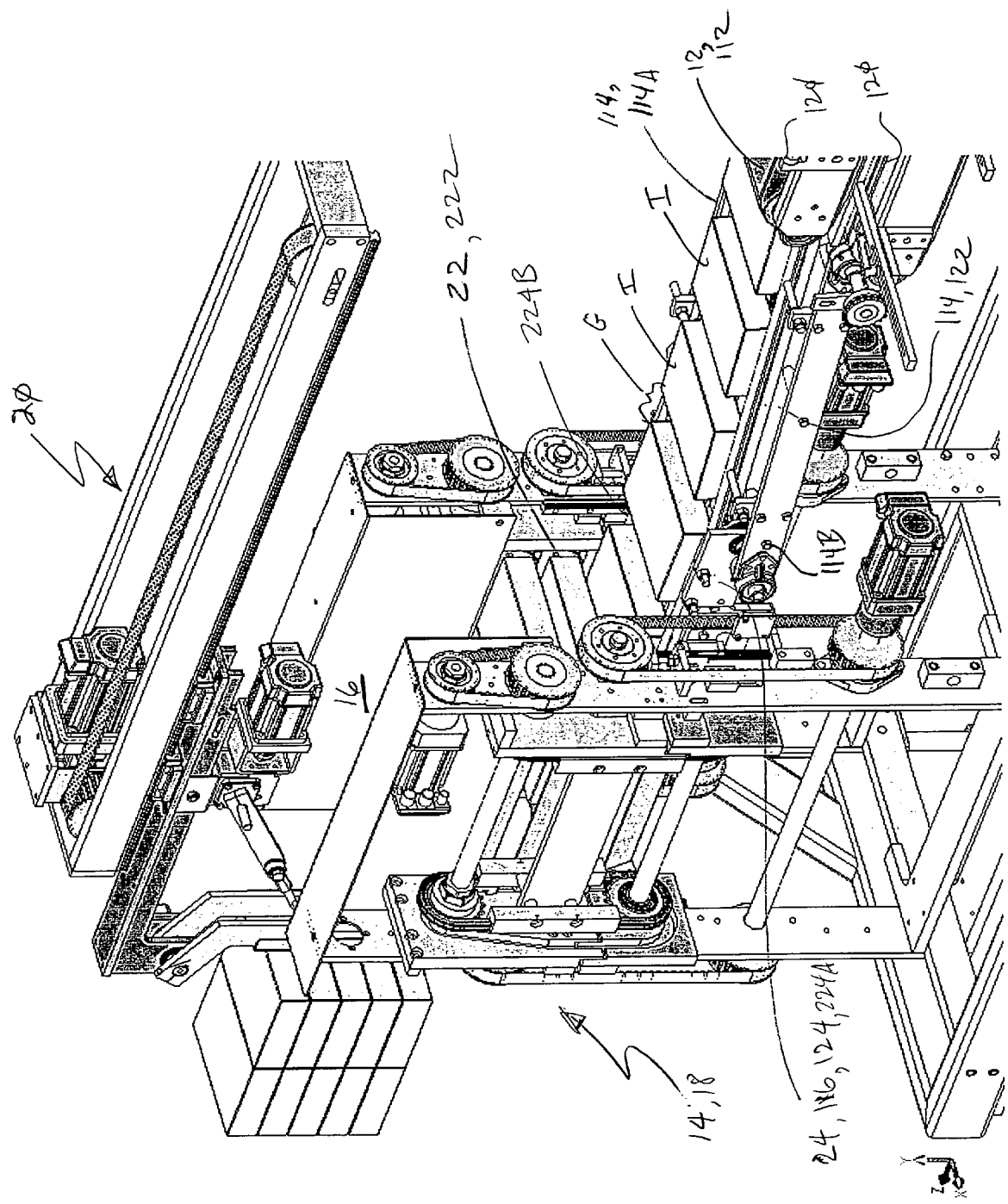

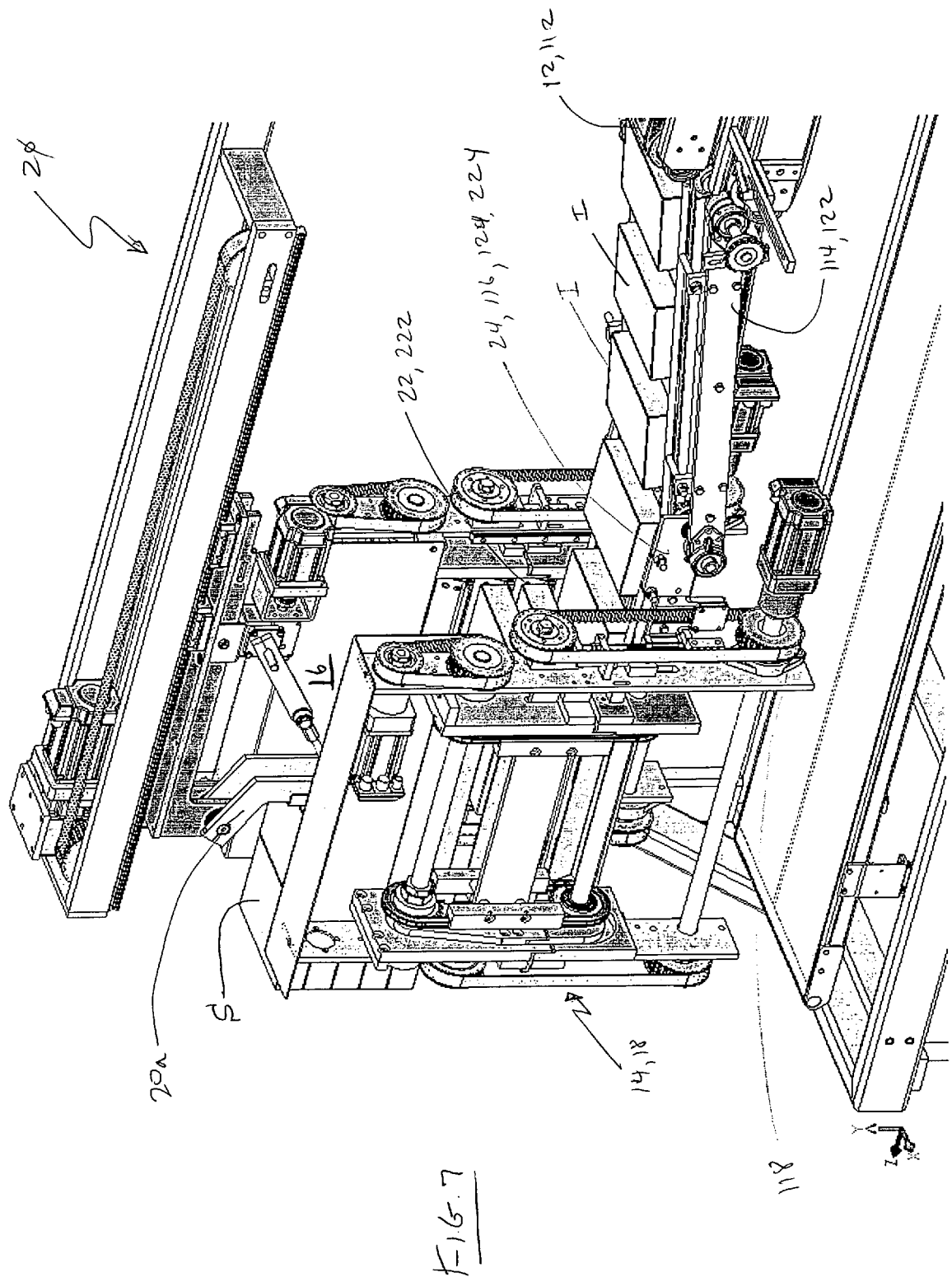

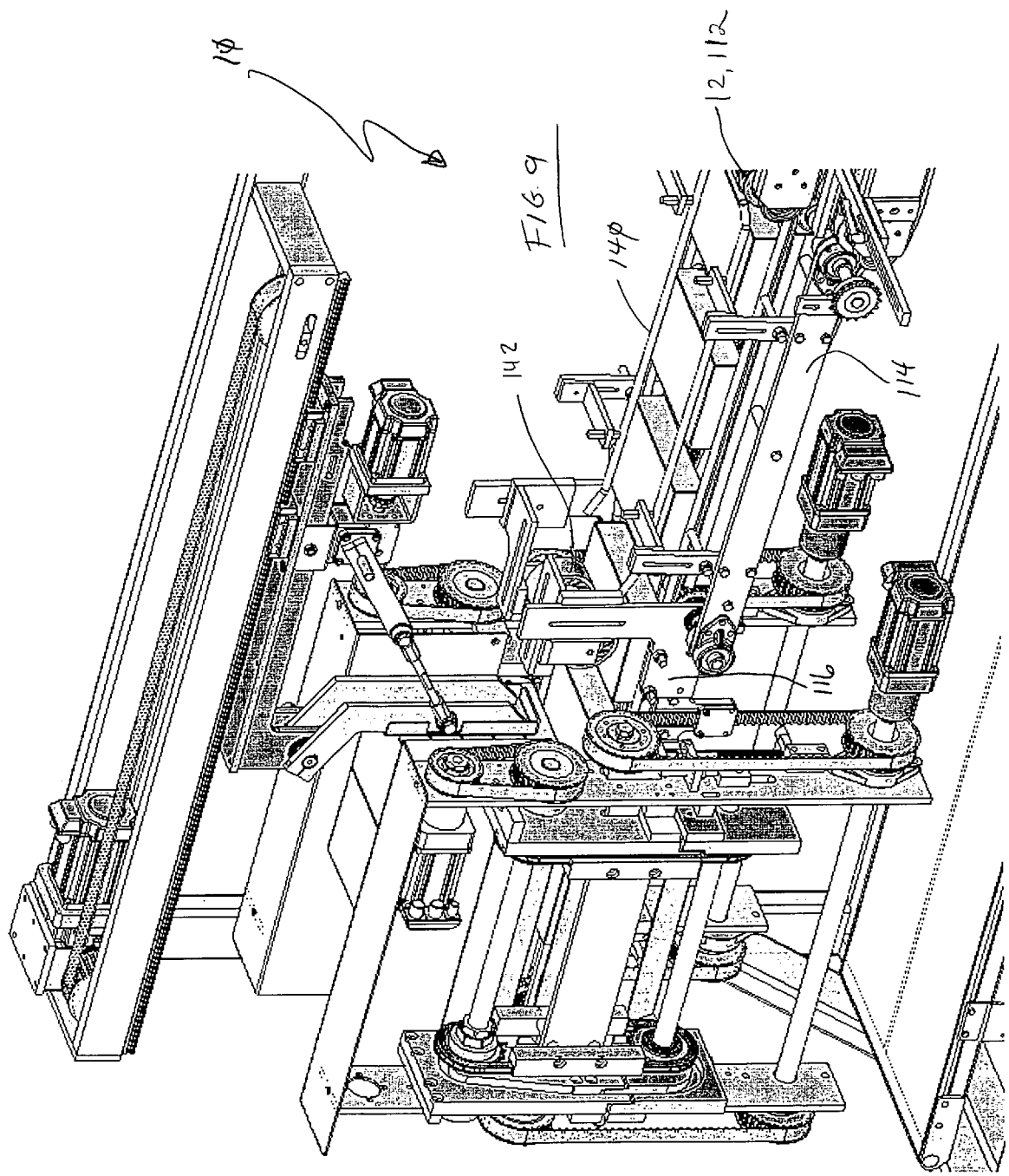

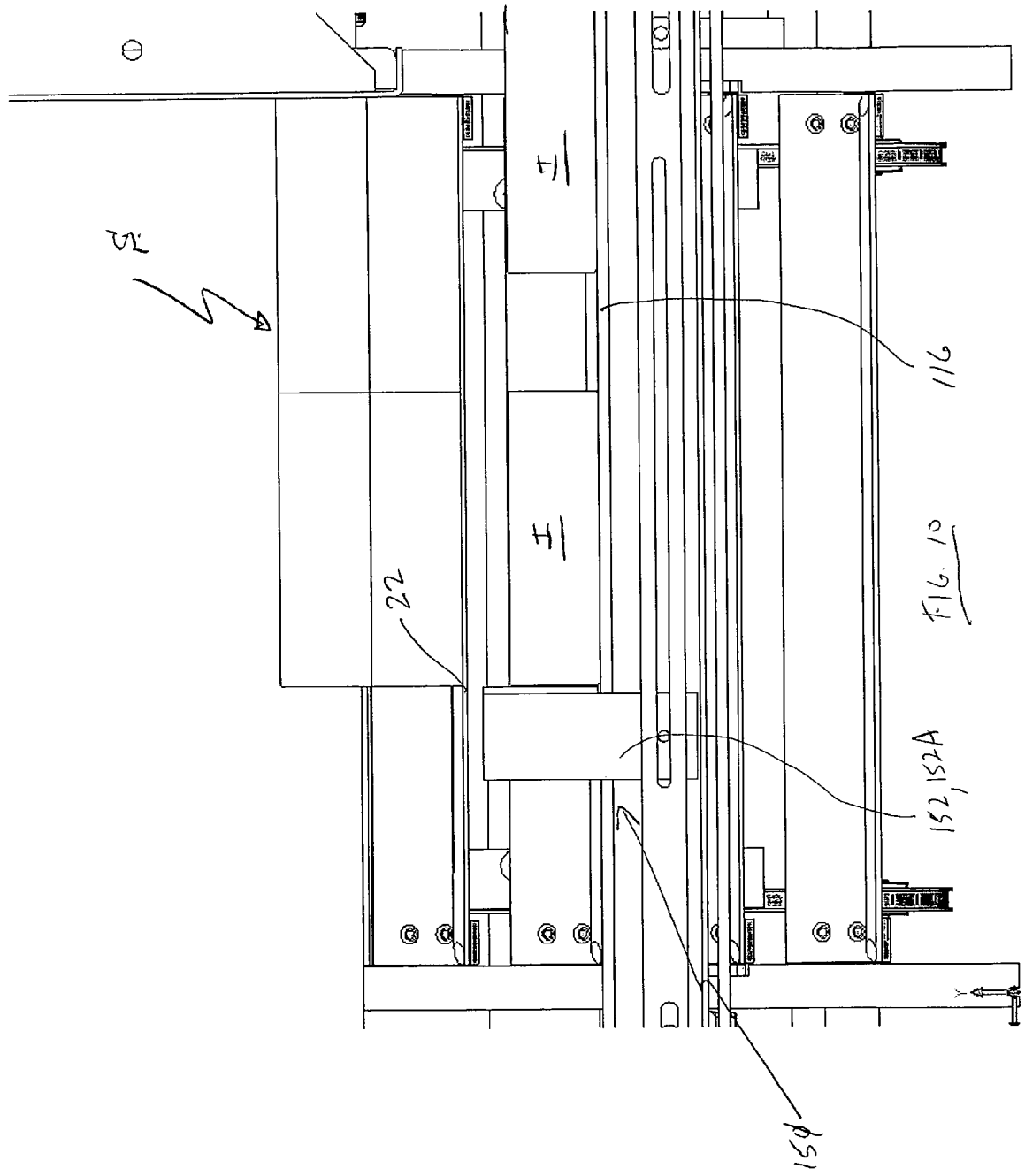

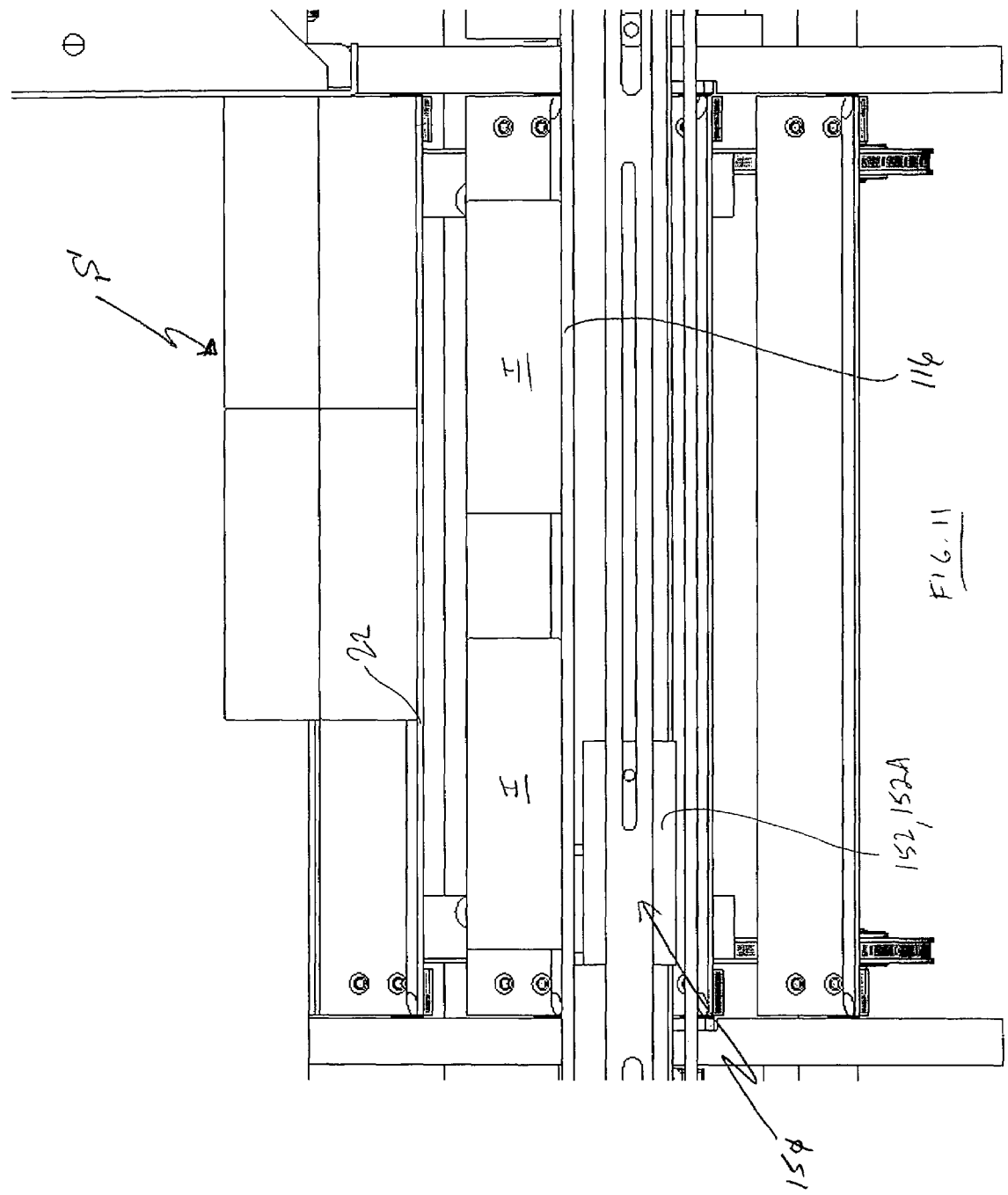

CARTON STACKING APPARATUS AND METHOD

BACKGROUND OF THE INVENTION

There is a need within the packaging industry to stack product of various sizes and pack patterns. This must be done reliably at high speeds. Quick change from one size to another within a specified range of product sizes is also required. Product that is incorrectly oriented must be prevented from entering the stacker or a machine jam could result. If a jam does occur, the product stacker design must have the ability to quickly clear and restart production to keep downtime to a minimum. The machine must have the ability to buffer incoming product while stacked product is unloaded from the machine.

SUMMARY OF THE INVENTION

An apparatus for stacking items, includes:
(a) a receiving mechanism for receiving incoming items;
(b) a stacking mechanism for receiving items from the receiving mechanism and stacking the items in a stacking area;
(c) a buffering mechanism for receiving incoming items when the stacking area is full; and
(d) a stack unloading mechanism.

A method for stacking incoming items, including the steps of:
(a) receiving an item in an item receiving mechanism;
(b) moving the item receiving mechanism to track the motion of a stacking mechanism;
(c) transferring the item from the item receiving mechanism to the stacking mechanism;
(d) stacking the item in a stacking area; and
(e) unloading the stacking area when the stacking area is full of items.

A principal object and advantage of the present invention is that it is readily adjustable for a wide variety of product sizes and pack patterns.

Another principal object and advantage of the present invention is that it provides increased throughput.

Another principal object and advantage of the present invention is that incorrectly oriented product drops through the apparatus for removal.

Another principal object and advantage of the present invention is that it has a jam clearance mechanism to facilitate jam clearance.

Another principal object and advantage of the present invention is that it has a buffering mechanism so that product flow does not stop during the stacking operation. As a result, conveyor speeds can be lower for a given output.

Another principal object and advantage of the present invention is that it accepts randomly spaced product.

Another principal object and advantage of the present invention is that no product accumulation is required prior to the item receiving mechanism. This eliminates the impact forces that can crush or deform product.

Another principal object and advantage of the present invention is that it has an anti-scuff mechanism that prevents the conveyor belt from scuffing the product surface when a stacker shelf is partially full and the flow of product is interrupted.

Another principal object and advantage of the present invention is that no prestack or clean out is required.

Another principal object and advantage of the present invention is that the design is powered throughout. Each individual product moves through the stacker without requiring subsequent product to push it into position. As a result, there are no dead spaces.

Another principal object and advantage of the present invention is that when sufficient product has been received to complete a given pack pattern, the pack pattern is advanced into the case or load area by the stack unloader. This leaves the stacking area completely empty of product.

Another principal object and advantage of the present invention is that the design does not require change parts to run different size products within the design range.

BRIEF DESCRIPTION OF DRAWINGS

FIGS. 2A–2B are cross-section views at approximately the lines 2 of FIG. 1.

FIGS. 3–7 are perspective views showing sequential stages in operation of the apparatus.

FIG. 9 is a perspective view of an alternate embodiment of the apparatus of the present invention having hold-down rails and hold-down rollers.

FIGS. 10–11 are side elevational views of the stacker conveyor showing the use of a movable backstop.

DETAILED DESCRIPTION OF THE PREFERRED EMBODIMENT

Figure 1:
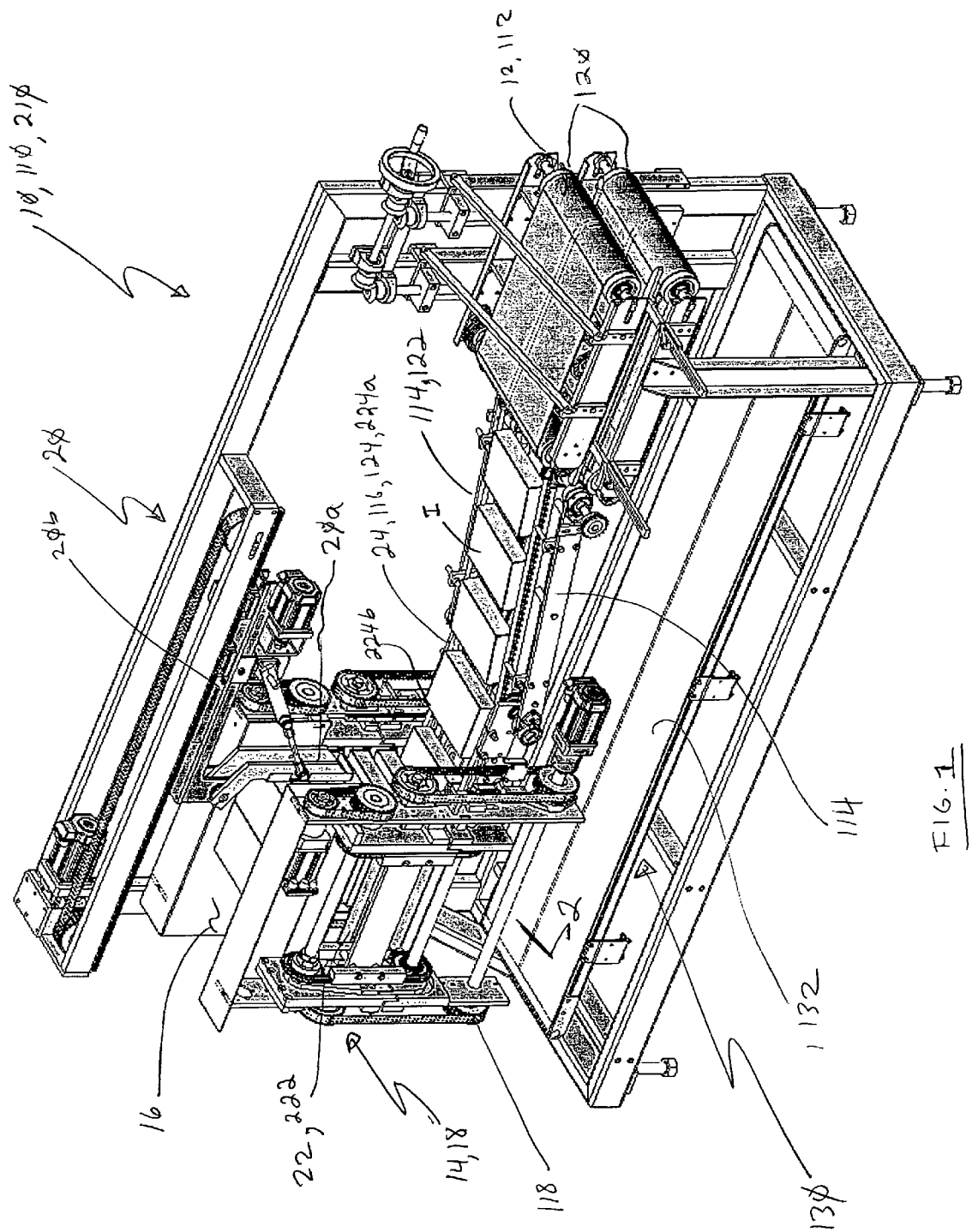
FIG. 1 is a perspective view of the apparatus of the present invention.
Figure 4:
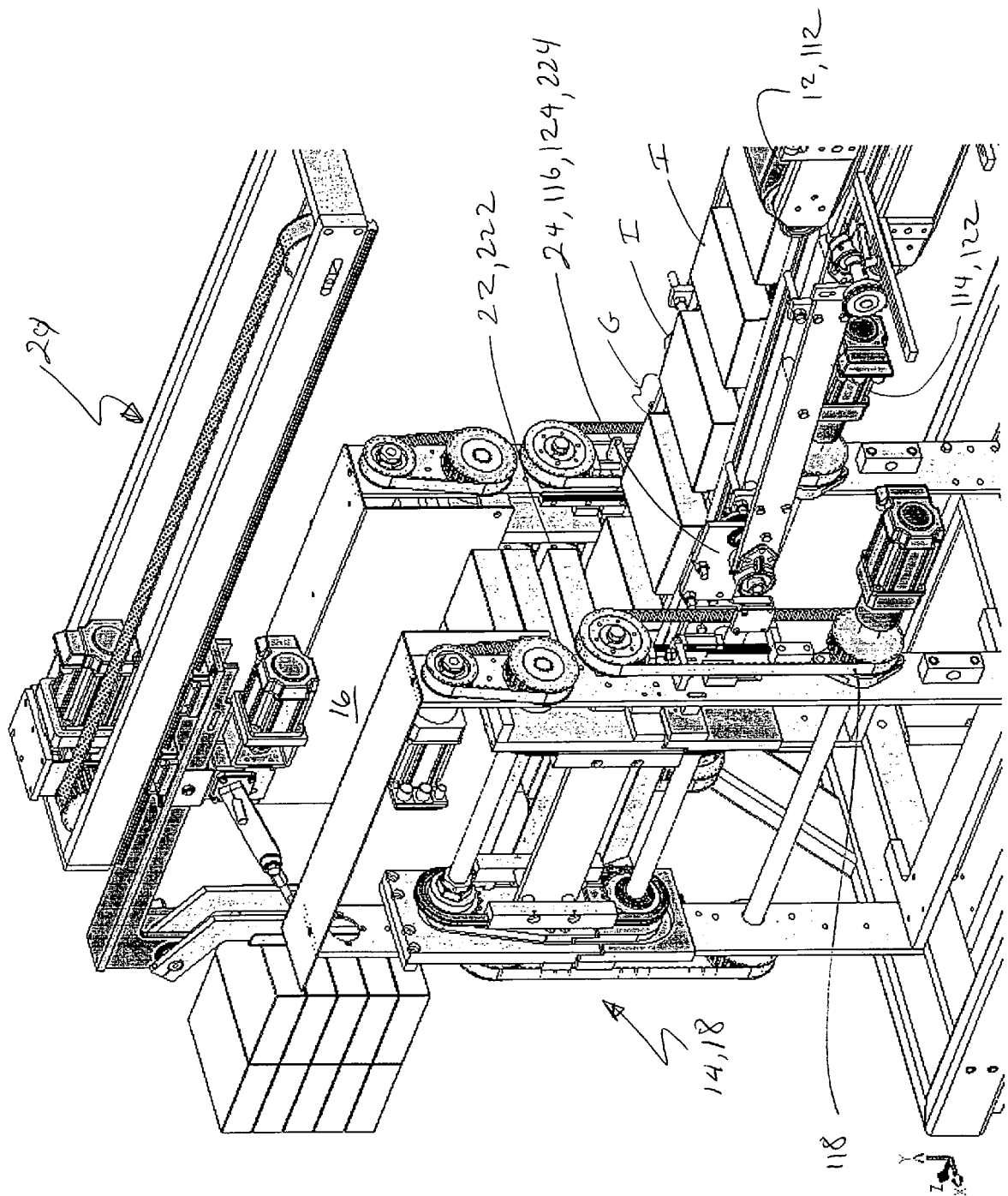
Figure 5:
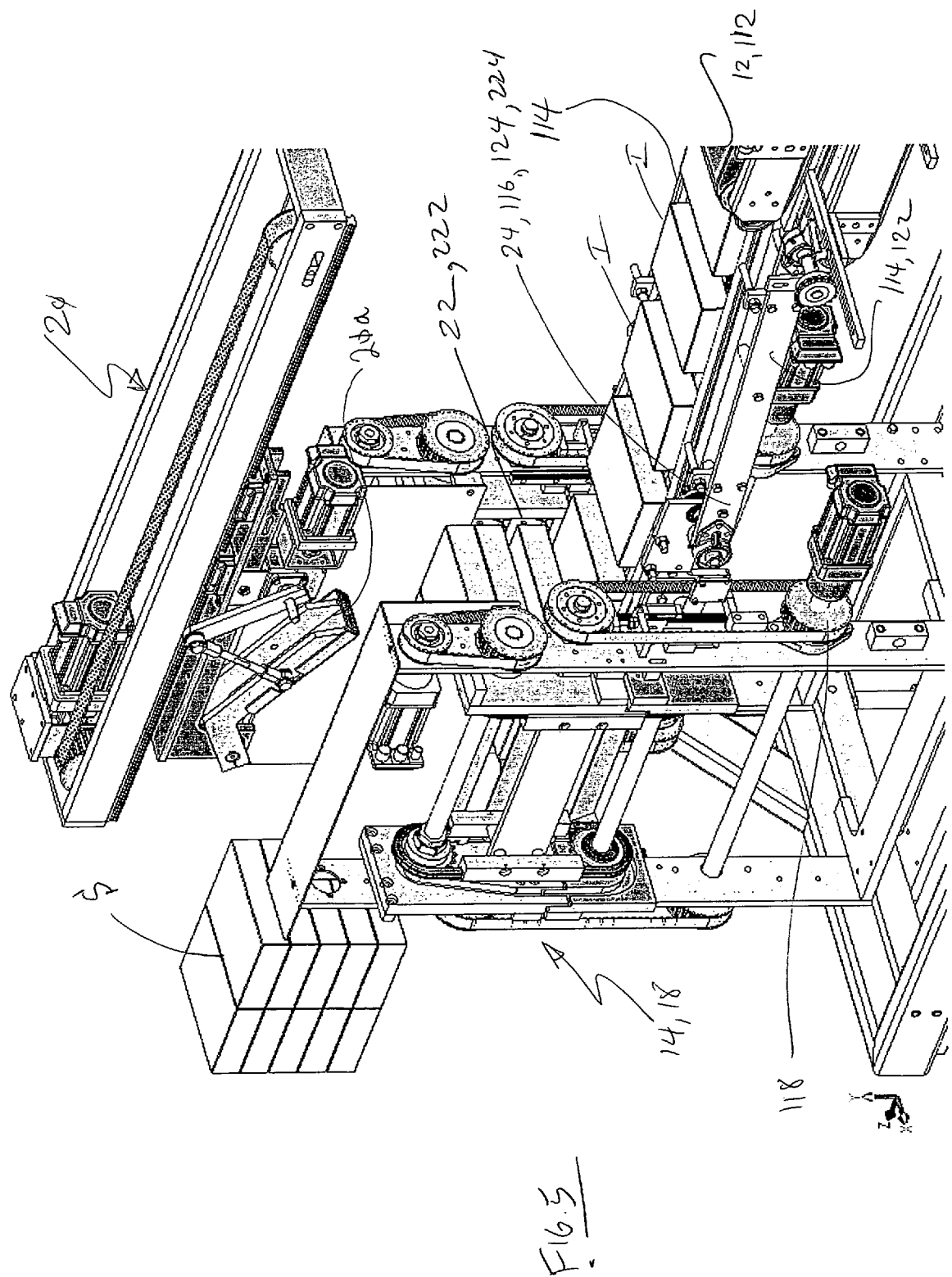

An apparatus according to the present invention is generally shown in the Figures as reference numeral 10, 110, and 210.

In one aspect, the apparatus 10 is an apparatus for stacking items I, comprising a receiving mechanism 12 for receiving incoming items; a stacking mechanism 14 for receiving items from the receiving mechanism 12 and stacking the items in a stacking area 16; a buffering mechanism 18 for receiving incoming items when the stacking area 16 is full; and a stack unloading mechanism 20.

In one embodiment, the stacking mechanism 14 further comprises a plurality of moving stacker shelves 22.

In one embodiment, the receiving mechanism 12 further comprises a conveyor 24 tracking the motion of the moving stacker shelves 22.

In one embodiment, the buffering mechanism 18 further comprises the plurality of moving stacker shelves 22 and the conveyor 24 tracking the motion of the moving stacker shelves 22.

In one embodiment, the conveyor 24 moves in a direction opposite the direction of movement of the moving stacker shelves 22, then tracks the motion of the moving stacker shelves 22.

In one embodiment, the moving stacker shelves 22 retract sequentially to stack items.

In one aspect, the apparatus 110 is an apparatus for stacking items I, comprising a first conveyor 112 receiving the items and controlling item flow into the apparatus; a second conveyor 114 receiving the items from the first conveyor 112 and (in one embodiment) running faster than the first conveyor 112 thereby creating a gap G between the items I; a stacker conveyor 116 receiving the items from the second conveyor 114; a plurality of moving stacker shelves 22 receiving the items from the stacker conveyor 116; and a shifting mechanism 118 for moving the stacker conveyor 116 adjacent one of the plurality of moving stacker shelves 22.

In one embodiment, the first conveyor 112 further comprises two belts 120 gripping the items therebetween.

In one embodiment, the second conveyor 114 further comprises a pair of spaced apart belts 122 supporting the items. The spaced apart belts 122 permit items I that are incorrectly oriented to drop out of the apparatus, preventing incorrect operation and jamming.

In one embodiment, the spacing between the belts 122 is adjustable.

In one embodiment, the stacker conveyor 116 further comprises a pair of spaced apart belts 124 supporting the items.

In one embodiment, the spacing between the belts 124 is adjustable.

In one embodiment, the stacker conveyor 116 adjusts for multiple sizes and pack patterns of items.

In one embodiment, the stacker conveyor 116 further comprises an anti-scuffing mechanism 128.

In one embodiment, the moving stacker shelves 22 retract sequentially to stack items.

In one embodiment, the apparatus 110 further comprises a jam clearance mechanism 130. The jam clearance mechanism 130 preferably comprises a mechanism that separates the pair of spaced apart belts 122 of the second conveyor 114, the stacking mechanism 14, and the stacking area 16, allowing items to fall out of the apparatus. The mechanism that separates the spaced apart belts may be hand-driven or powered by a motor (not shown). The cleared items may drop onto the conveyor 132 or exit the apparatus by equivalent means, such as a chute.

In one embodiment, the apparatus 110 further comprises hold-down rails 140 on the second conveyor 114 and hold-down rollers 142 on the stacker conveyor 116.

In one embodiment, the apparatus 110 further comprises an overflow mechanism 150 that permits items to flow out of the apparatus without being stacked in the event of a back-up in downstream equipment while upstream equipment must run.

In one aspect, the present invention is an apparatus 210 for stacking incoming items, comprising: a set of recycling stacker shelves 222 moving in a substantially vertical path; a conveyor 224 having a receiving end 224a for receiving incoming items and a depositing end 224b for transferring the items I one at a time to one of the set of recycling stacker shelves 222.

The set of recycling stacker shelves 222 retract to stack the items I in a stacking area 16.

The conveyor's depositing end 224b tracks the motion of the set of recycling stacker shelves 222.

In one embodiment, the apparatus 210 further comprises a stack unloader 20.

In one embodiment, the apparatus 210 further comprises a jam clearance mechanism 130.

In one aspect, the present invention is a method for stacking incoming items, comprising the steps of: a) receiving an item in an item receiving mechanism; b) moving the item receiving mechanism to track the motion of a stacking mechanism; c) transferring the item from the receiving mechanism to the stacking mechanism; d) stacking the item in a stacking area; and e) unloading the stacking area when the stacking area is full of items.

In one embodiment, the step d) of stacking the item is disabled when the stacking area is full of items.

In one embodiment, the step e) occurs concurrently with steps a) through c).

In one aspect, the present invention is a method for stacking incoming items, comprising the steps of: a) receiving the items on a first conveyor; b) transferring the items to a second conveyor running faster than the first conveyor, thereby creating a gap between the items; c) transferring the items to a stacker conveyor; d) positioning the stacker conveyor adjacent one of a plurality of moving stacker shelves; e) transferring an item to one of the plurality of moving stacker shelves; f) retracting each stacker shelf to stack items in a stacking area; and g) unloading the stacked items from the stacking area.

In one embodiment, the method further comprises the step of repeating steps d) and e) when the stacking area is full of items.

In one embodiment, the step d) further comprises moving the stacker conveyor in a direction opposite that of the moving stacker shelves, then tracking the motion of a stacker shelf as the item is transferred from the stacker conveyor to the moving stacker shelf.

In one embodiment, step f) is disabled when the stacking area is full of items.

In one embodiment, step g) further comprises unloading the stacked items out of the stacking area with a stack unloader and returning the stack unloader above items being stacked.

In one embodiment, the method further comprises the step of stopping the first conveyor when the stacking area and the plurality of moving stacker shelves are full of items.

Operation of the apparatus and method will now be described, with reference to the Figures.

The basic concept is that a single stream of items is fed into the apparatus. The items are generally flat products. A conveyor receives the incoming items and establishes a gap between the items. The conveyor feeds a layer of items into a stacker shelf. The stacker shelves index upward to stack another layer of product. This builds a stack one layer at a time from the bottom. Once a sufficient number of layers have been accumulated, an unloader pushes the complete stack out of the stack area off the top shelf. During the unload action, the stacker up stack action is blocked by the presence of the unloader. The conveyor continues filling shelves by moving down to lower shelves. This buffers product until the unloader is out of the way to allow stacking again. The product inflow is thus a continuing moving stream of individual products, and the product outflow is periodic as entire stacks.

Specifically referring to FIGS. 3–7, detailed operation is as follows.

FIGS. 3–7 show the apparatus in a state of receiving items I. Items I are received on the first conveyor 112. Items I are received between the belts 120 to increase the force between the items and the conveyor for the purpose of preventing slippage.

Items then move to the second conveyor 114. The speed of the second conveyor 114 may be set to run faster than the first conveyor 112 in order to make gaps G between the incoming items I. The gaps are required for shifting and gap detection by a detector (not shown) to initiate a shift between stacker shelves 22 when a layer count is reached. Alternatively, gaps may be created between slugs of items rather than between each item. The second conveyor 114 pivots to act as a bridge between the first conveyor 112 and the stacker conveyor 116. The discharge end 114B of the second conveyor 114 is attached to the stacker conveyor 116 which moves vertically so the discharge end of the second conveyor also moves vertically. The infeed end 114A of the second conveyor 114 is aligned vertically to accept items from the first conveyor 112. The infeed end may slide horizontally in reaction to a vertical motion of the discharge end. Alternatively, a pivot arm may support this end such that it moves in a short arc generally toward and away from the first conveyor 112 with very little vertical motion. The second conveyor is constructed so that it can be adjusted to account for varying product widths. Specifically, the second conveyor has left and right spaced-apart belts that support the items. The spacing between the belts can be changed to accommodate different item widths.

Items then move to the stacker conveyor 116. This is a horizontal section of conveyor that is supported at each end to move vertically. The conveyor 116 is arranged between the stacker shelves 22. The conveyor 116 is constructed to have a left side 116a and a right side 116b that can be adjusted by moving either side a determined width or center-adjusted by moving both sides equally, but half the width required. There is an adjustable product stop 152 (FIG. 10) at the end of this conveyor. As the items for one layer accumulate, the end item is driven into the stop. Further items abut to form one layer.

The stacker shelves may move apart to accommodate different width items. The stacker shelves 22 move vertically to receive items from the stacker conveyor 116. The position of the stacker conveyor 116 is set to track the motion of the stacker shelves 22 until each layer is complete. The shelves move upward as each layer is complete. The stacker conveyor 116 will move downward at a higher rate than the stacker shelves 22 move upward. In one embodiment, he stacker conveyor 116 down acceleration is set not to exceed gravity so that items remain in contact with the top of the conveyor 116.

In an alternate embodiment (FIG. 9), hold-down rails 140 may be provided to keep the items in contact with the second conveyor 114 and hold-down rollers 142 to keep the product in contact with the stacker conveyor 116 during movement of the stacker conveyor 116. The hold-down rollers 142 may be powered or free-wheeling.

The stacker shelves 22 have parallel ledges 22a (FIG. 2A) at a regular spacing. Each ledge 22a acts as a shelf to support one layer of items I. As each layer is filled, the stacker shelves 22 index upward to stack another layer. The assembled stack S rests on the top shelf. The shelves are designed to pull out, as shown in FIG. 2A, so that the stack S drops down onto the next layer, which is rising.

An anti-scuffing mechanism 128 (FIGS. 2A-2B) is provided as follows. If a stack layer is partially complete, the first items 1 will stop at the product stop 152 (FIG. 10) on the stacker conveyor 116 while the stacker conveyor 116 continues to drive the items 1. This can result in scuff marks on the items 1. If another incoming item is not detected, the stacker conveyor 116 moves down slightly from its normal position (FIG. 2A) to let the product rest on the stacker shelves 22 instead of the stacker conveyor 116, as seen in FIG. 2B. When the next incoming item 1 is detected, the stacker conveyor 116 quickly moves back up to its normal position. This process will repeat as necessary until a complete layer is created. Once the layer is complete, the stacker conveyor 116 will move down to the next shelf position.

Figure 6:
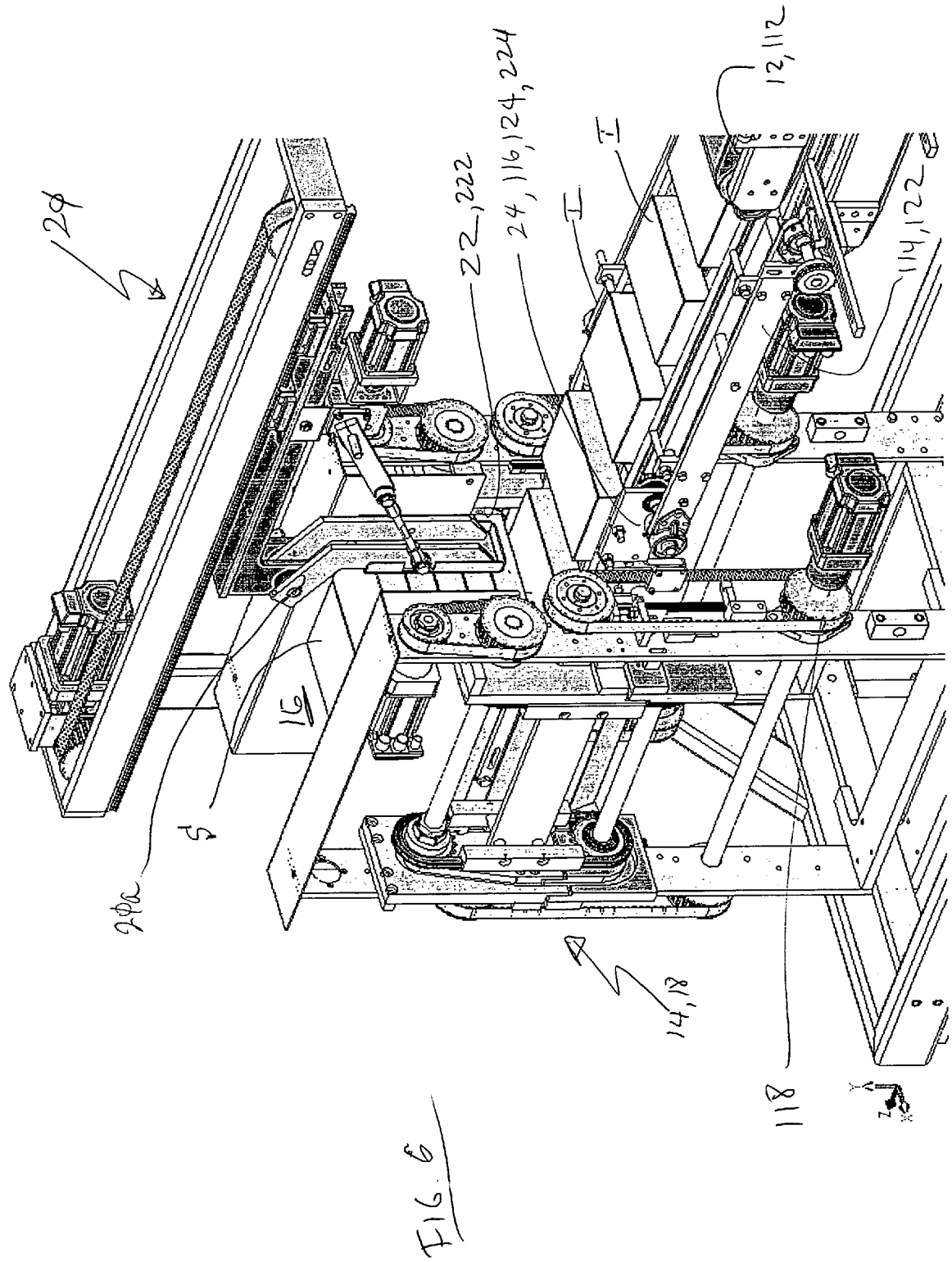

In FIG. 6, a stack has been completed and the stack unloader 20 has moved the stack unloader pusher 20a against the stack S. Items continue to be received in the stacker shelves 22, as described above. FIG. 7 shows the buffering action of the stacker shelves 22 as more items are received. The Figure shows that the stacker conveyor 116 has moved downward to the lowest stacker shelf 22 to provide maximum buffering for incoming product.

FIG. 7 shows the completed stack S being unloaded from the apparatus.

The apparatus 10 also preferably comprises a jam clearance or clean out mechanism 130. The jam clearance mechanism 130 will allow product to be removed from the stacking area 16, from the stacking mechanism 14, from the stacker shelves 22, from the stacker conveyor 116, and from the second conveyor 114. When a clean-out situation occurs, the clean-out mechanism 130 can be activated by multiple options. One option is to send an electrical signal to energize a motor. A second option is to signal the machine operator that they will need to manually operate the clean-out mechanism 130 (probably by using a hand wheel). All options will move the left and right belts 122 of the second conveyor 114 away from each other. In addition, all components downstream of the second conveyor 114, such as the stacker conveyor 116 and the stacker shelves 22, are also separated. This can be accomplished by moving both sides or having one side fixed and moving the other side. Once the two sides are separated, the product will fall through and land on either a chute or a powered conveyor 132. The two sides will then reposition to their operating width and begin stacking product. Another option for the product would be to land on a deck that can be rolled out from under the machine.

Figure 8A:
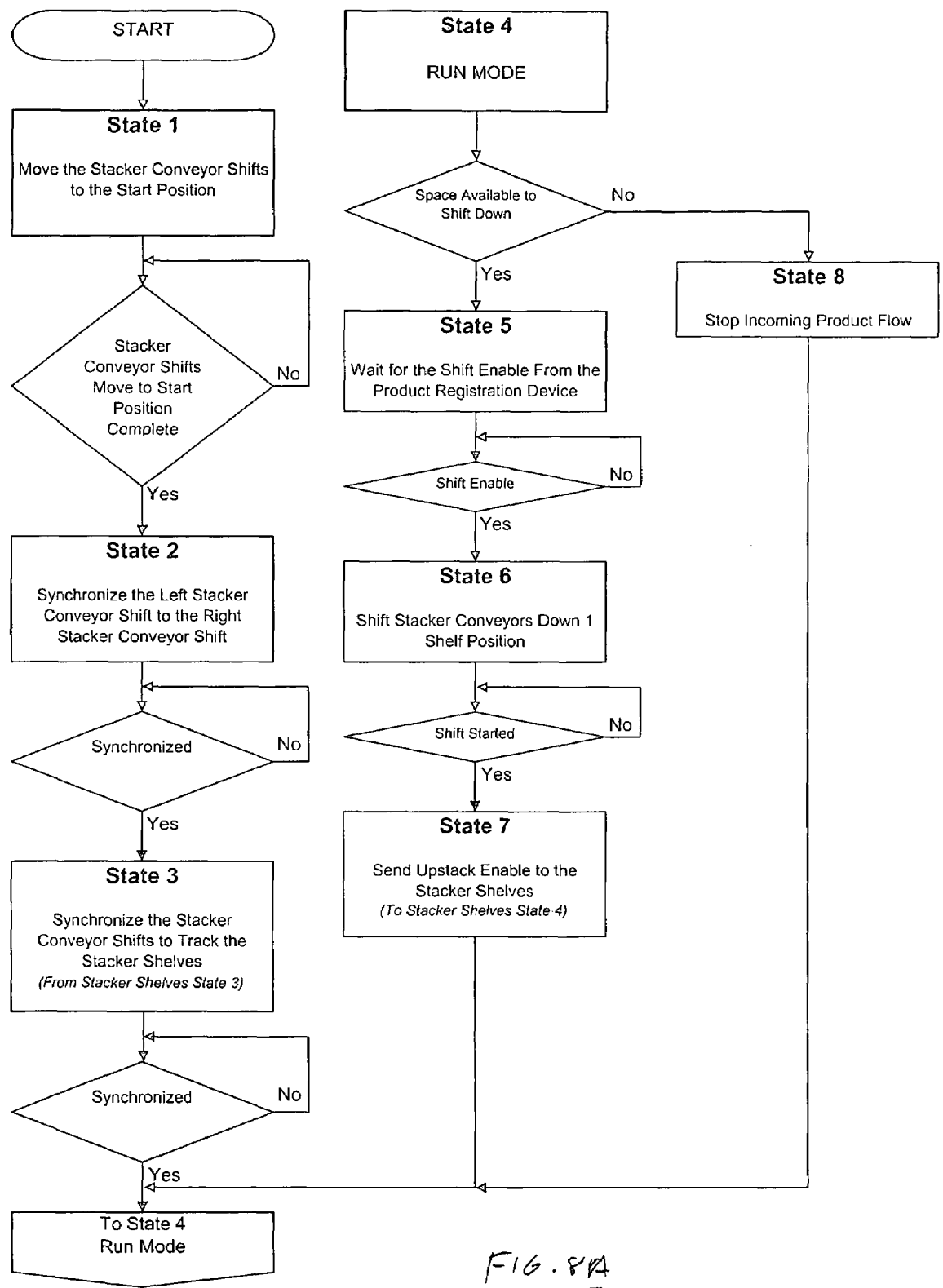
FIGS. 8A–8C are flowcharts of the methods of the present invention.
Figure 8B:
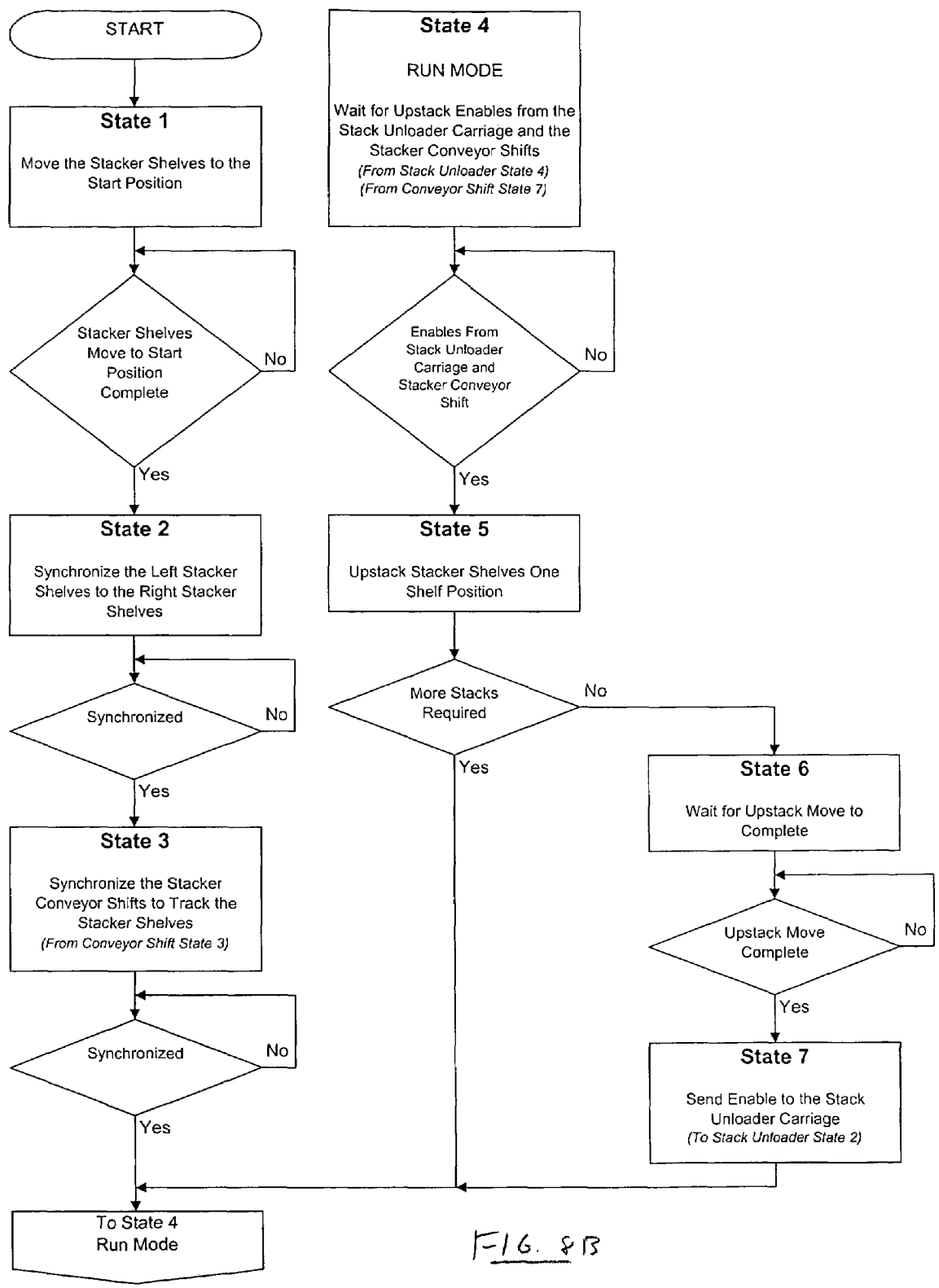
Figure 8C:
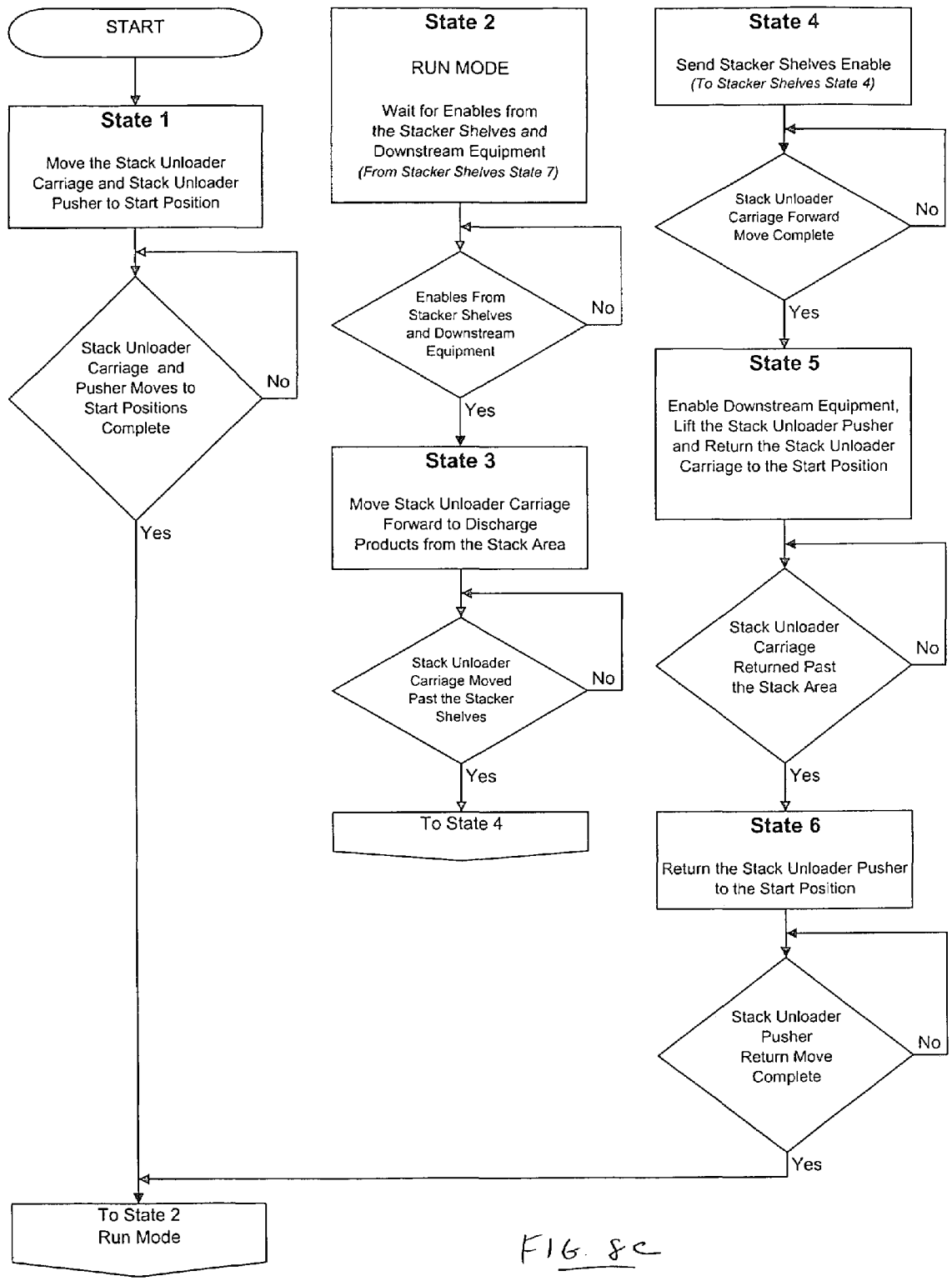

FIGS. 8a–8c are a detailed flowchart of the machine logic of the apparatus.

FIG. 8a is a flowchart of the machine logic of the stacker conveyor 116. The stacker conveyor 116 is moved to the Start position in State 1. At State 2, the left and right stacker conveyors 116a, 116b are synchronized. At State 3, the stacker conveyor 116 is synchronized to the stacker shelves 22. Run Mode begins at State 4. Assuming that there is space available in the stacker shelves 22, and the product registration device has detected a full layer of products, the shift mechanism 118 shifts the stacker conveyor 116 down one shelf position. When the movement is started, the logic sends an Upstack Enable signal to the stacker shelves 22. If no more space is available in the stacker shelves 22, the logic stops incoming product flow.

FIG. 8b is a flowchart of the machine logic of the stacker shelves 22. States 1–3 are similar to the above logic of the stacker conveyor. In Run Mode, at State 4 the shelves logic waits for an Upstack Enable signal from the unloader 20 and the Upstack Enable signal from the stacker conveyor logic. Then the logic shifts the stacker shelves up one position. When no more stacks are required (a complete stack has been made), the logic sends an Enable signal to the unloader 20.

FIG. 8c is a flowchart of the machine logic of the unloader 20. The stack unloader carriage 20b and stack unloader pusher 20a are first moved to their start positions. Run Mode begins at State 2. The logic waits for Enables from the stacker shelves 22 and from downstream equipment. Then the logic moves the stack unloader carriage 20b forward to discharge products from the stacking area 16. When the stack unloader pusher 20a moves past the stacking area 16, the logic sends an Upstack Enable signal to the stacker shelves 22. When the discharge move is complete (State 5), the logic enables the downstream equipment, lifts the stack unloader pusher 20a, and returns the stack unloader carriage to the start position. When the stack unloader carriage has returned past the stacking area 16, the stack unloader pusher 20a returns to the start position.

FIGS. 10 and 11 illustrate the operation of the overflow mechanism 150 that will allow items I to pass through the machine without being stacked in the event of a back-up in downstream equipment. The overflow mechanism 150 comprises a movable backstop 152A similar to the normal backstop 152, except that the product stop 152A moves, for example by pivoting, from its normal position (FIG. 10) to an overflow position (FIG. 11). In the overflow position, the backstop 152A no longer stops items I coming in on the stacker conveyor 116, so that the items 1 are not placed on the stacker shelves 22, but instead are carried out of the apparatus 10,110,210 to some appropriate overflow area, for example the conveyor 132.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Apparatus for stacking items, comprising:
   (a) a first conveyor receiving the items and controlling item flow into the apparatus, with the first conveyor having a discharge end;
   (b) a second conveyor having an infeed end receiving the items from the discharge end of the first conveyor and having a discharge end;
   (c) a stacker conveyor having an infeed end receiving the items from the discharge end of the second conveyor;
   (d) a plurality of moving stacker shelves receiving the items from the stacker conveyor;
   (e) a shifting mechanism for moving the stacker conveyor adjacent one of the plurality of moving stacker shelves, with the discharge end of the second conveyor moving with the infeed end of the stack conveyor such that angular relationships between the second conveyor and the first conveyor and between the second conveyor and the stacker conveyor change with movement of the stacker conveyor; and
   (f) a stack unloader.

2. The apparatus of claim 1, wherein the first conveyor further comprises two endless, vertically spaced, parallel belts gripping the items therebetween.

3. The apparatus of claim 1, wherein the second conveyor further comprises a pair of parallel, spaced apart belts supporting the items sitting thereon.

4. The apparatus of claim 3, wherein the spacing between the belts is adjustable.

5. The apparatus of claim 4, wherein the stacker conveyor further comprises a pair of parallel, spaced apart belts supporting the items sitting thereon.

6. The apparatus of claim 5, wherein the spacing between the belts is adjustable.

7. The apparatus of claim 3, wherein the apparatus further comprises a jam clearance mechanism that separates the pair of parallel, spaced apart belts of the second conveyor, allowing product to fall out of the apparatus.

8. The apparatus of claim 7, further comprising a cleanout conveyor upon which the cleared product falls.

9. The apparatus of claim 7, further comprising a motor separating the spaced apart belts.

10. The apparatus of claim 7, wherein the stacker conveyor further comprises a pair of spaced apart belts supporting the items, wherein the jam clearance mechanism further comprises a mechanism to separate the spaced apart belts of the stacker conveyor, and wherein the jam clearance mechanism further comprises a mechanism to separate the stacker shelves.

11. The apparatus of claim 3, wherein the spaced apart belts permit incorrectly oriented items to drop between the spaced apart belts.

12. The apparatus of claim 1, wherein the stacker conveyor adjusts for multiple sizes and pack patterns of items.

13. The apparatus of claim 1, wherein the stacker conveyor further comprises an anti-scuffing mechanism.

14. The apparatus of claim 1, wherein the stacker shelves retract sequentially to stack the items.

15. The apparatus of claim 1, further comprising a jam clearance mechanism.

16. The apparatus of claim 1, wherein the second conveyor runs faster than the first conveyor, thereby creating a gap between each item.

17. The apparatus of claim 1, further comprising hold-down rails in a spaced parallel relation to the second conveyor engaging the items; and hold-down rollers engaging the items in a spaced relation to the stacker conveyor, with the items located between the hold-down rails and the second conveyor and hold-down rollers and the stacker conveyor.

18. The apparatus of claim 1, further comprising an overflow mechanism permitting items to flow out of the apparatus without being stacked when there is a back-up in downstream equipment.

19. The apparatus of claim 18, wherein the overflow apparatus further comprises a movable backstop on the stacker conveyor, with the backstop being movable between an overflow position and a normal position, with the backstop in the normal position extending outwardly from the stacker conveyor stopping the items transferred on the stack conveyor, with the backstop in the overflow position not interfering with the items transferred on the stack conveyor.

20. A method for stacking incoming items, comprising the steps of:
   (a) receiving the items on a first conveyor;
   (b) transferring the items to a second conveyor;
   (c) transferring the items to a stacker conveyor;
   (d) vertically positioning the stacker conveyor adjacent one of a plurality of moving stacker shelves;
   (e) transferring an item to one of the plurality of moving stacker shelves;
   (f) retracting each stacker shelf to stack items in a stacking area; and
   (g) unloading the stacked items from the stacking area.

21. The method of claim 20, further comprising the step of repeating steps (d) and (e) when the stacking area is full of items.

22. The method of claim 20, wherein step (d) further comprises moving the stacker conveyor in a direction opposite that of the moving stacker shelves, then tracking the motion of a stacker shelf as the item is transferred from the stacker conveyor to the moving stacker shelf.

23. The method of claim 20, wherein step (f) is disabled when the stacking area is full of items.

24. The method of claim 20, wherein step (g) further comprises unloading the stacked items out of the stacking area with a stack unloader and returning the stack unloader above items being stacked.

25. The method of claim 20, further comprising a step of stopping the first conveyor when the stacking area and the plurality of moving stacker shelves are full of items.

26. The method of claim 20, wherein the second conveyor runs faster than the first conveyor, thereby creating a gap between the items.

27. Apparatus for stacking items, comprising:
(a) a receiving mechanism for receiving incoming items;
(b) a stacking area wherein the items are stacked one upon the other;
(c) a stacking mechanism for receiving items from the receiving mechanism and stacking the items in the stacking area;
(d) a buffering mechanism for receiving incoming items when the stacking area is full; and
(e) a stack unloading mechanism;
(f) wherein the stacking mechanism further comprises a plurality of moving stacker shelves, wherein the receiving mechanism further comprises a conveyor moving in the direction of motion of the moving stacker shelves and tracking the motion of the moving stacker shelves, and wherein the buffering mechanism further comprises the plurality of moving stacker shelves and the conveyor tracking the motion of the moving stacker shelves.

28. The apparatus of claim 27, wherein the conveyor moves in a direction opposite to the direction of motion of the moving stacker shelves, then tracks the motion of the moving stacker shelves.

29. The apparatus of claim 27, wherein the moving stacker shelves retract sequentially to stack items.

30. Apparatus for stacking incoming items, comprising:
(a) a set of recycling stacker shelves moving in a substantially vertical path;
(b) a conveyor having a receiving end for receiving incoming items and a depositing end for transferring the items one at a time to one of the set of recycling stacker shelves;
(c) wherein the set of recycling stacker shelves retract to stack the items in a stacking area; and
(d) wherein the conveyor's depositing end moves substantially vertically to track the motion of the set of recycling stacker shelves.

31. The apparatus of claim 30, further comprising a stack unloader.

32. The apparatus of claim 30, further comprising a jam clearance mechanism.

33. The apparatus of claim 30, further comprising an overflow mechanism.

* * * * *